May 19, 1959 S. T. COULTER ET AL 2,887,390
METHOD AND APPARATUS FOR SPRAY DRYING
Filed July 13, 1953 7 Sheets-Sheet 1

INVENTORS
SAMUEL T. COULTER
VERNE H. TOWNLEY
BY Paul, Moore & Rugger
ATTORNEYS

INVENTORS
SAMUEL T. COULTER
VERNE H. TOWNLEY
BY Paul, Moore & Rugger
ATTORNEYS

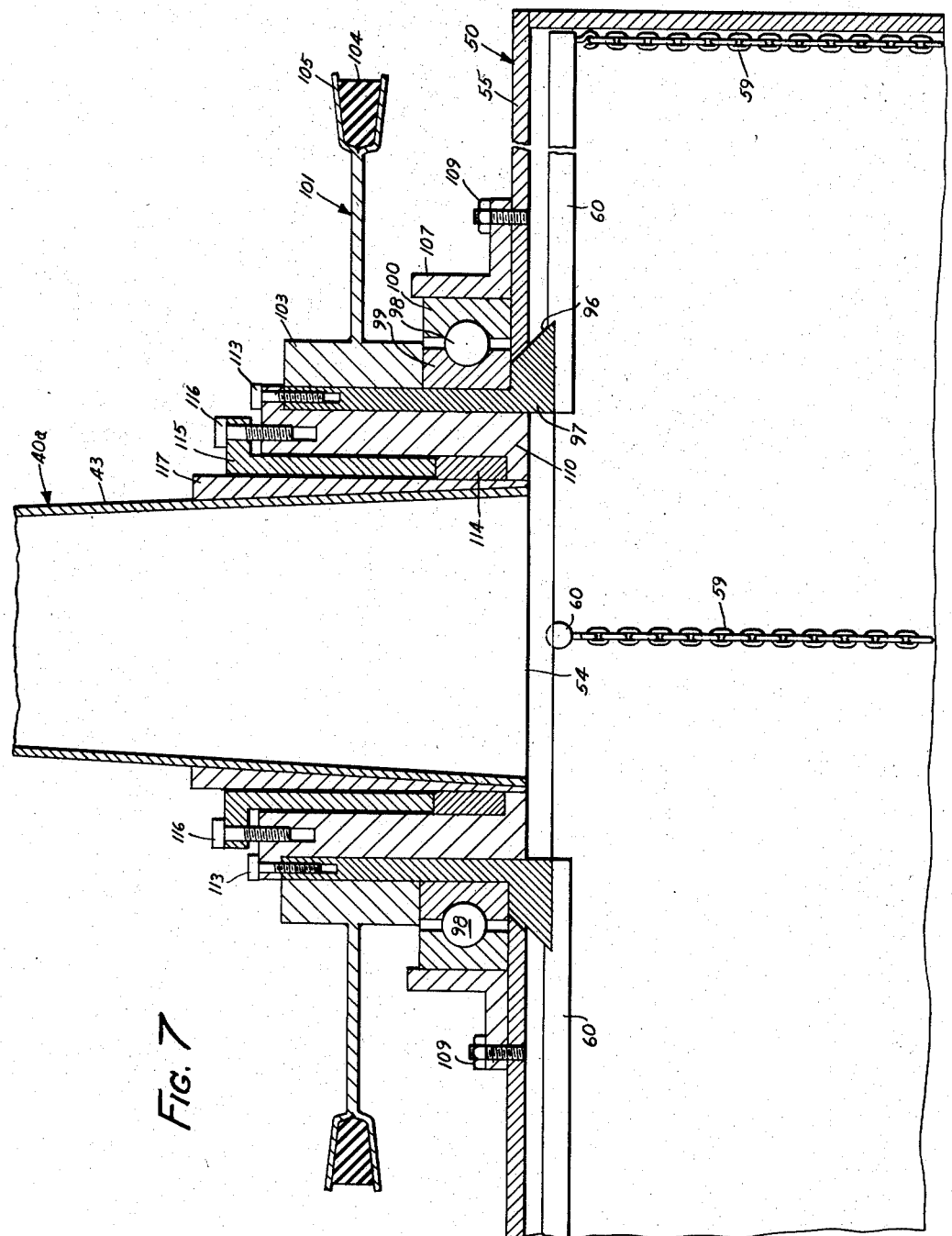

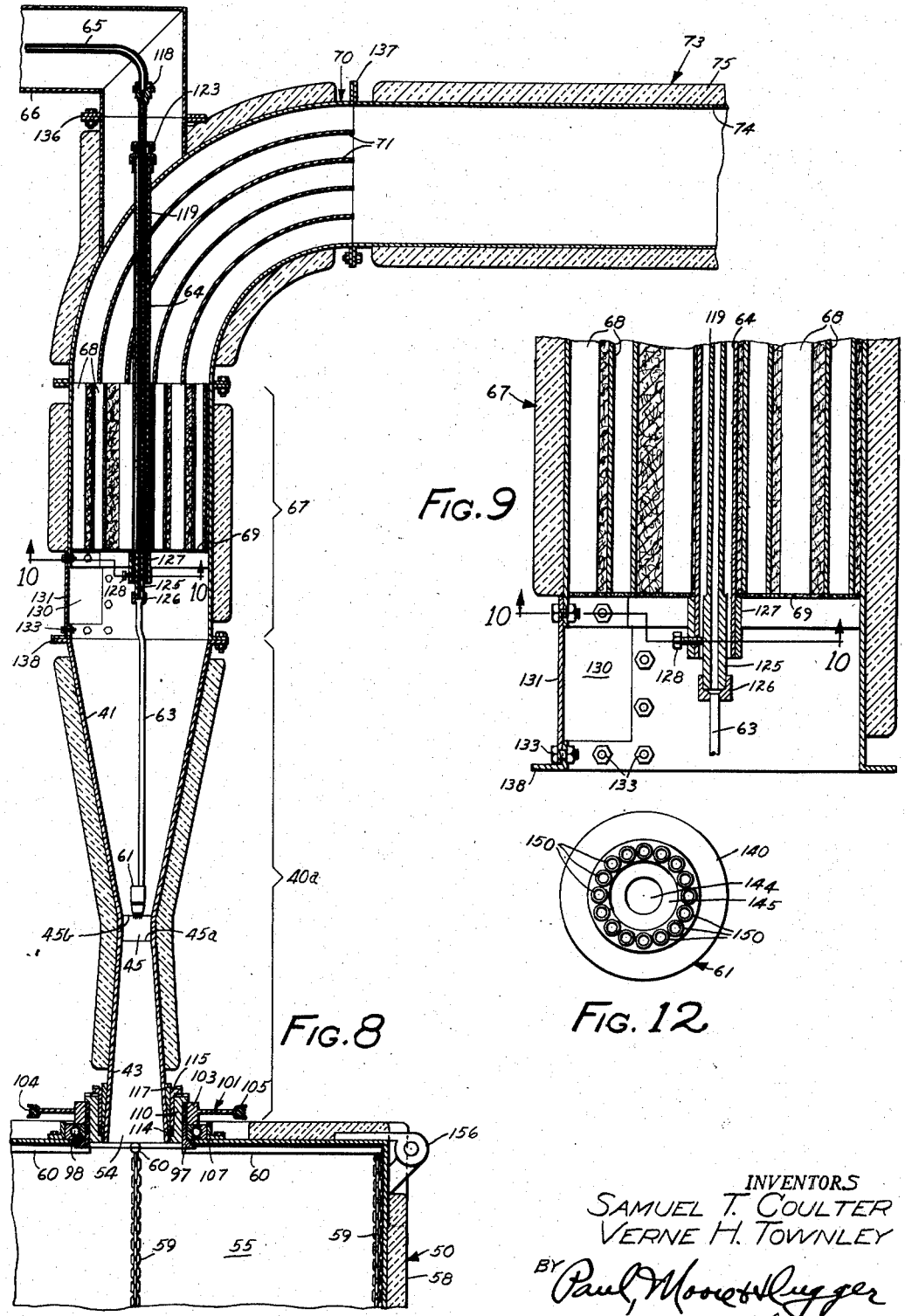

INVENTORS
SAMUEL T. COULTER
VERNE H. TOWNLEY
BY Paul, Moore & Rugger
ATTORNEYS

INVENTORS
SAMUEL T. COULTER
VERNE H. TOWNLEY
ATTORNEYS

United States Patent Office 2,887,390
Patented May 19, 1959

2,887,390

METHOD AND APPARATUS FOR SPRAY DRYING

Samuel T. Coulter, Marine on St. Croix, and Verne H. Townley, Falcon Heights, Minn., assignors to Regents of the University of Minnesota, Minneapolis, Minn., a corporation of Minnesota Application July 13, 1953, Serial No. 367,472

13 Claims. (Cl. 99—199)

This invention relates to methods and apparatus for the spray drying of liquids containing solid particles to be dried. More particularly, this invention relates to an improved method and apparatus for spray drying liquid foodstuffs, such as milk and other lacteal products, eggs, fruit juices and the like.

The principal object of this invention is to provide a method and apparatus for spray drying of increased efficiency utilizing a relatively low pressure and low velocity stream of liquid to be dried, and a high velocity stream of a gaseous drying medium maintained at relatively high temperatures.

Another object of this invention is to provide an improved method of atomizing liquids containing solids to be dried by injecting them at low velocity and concurrently into a stream of hot drying gases moving at high velocities.

Still another object of this invention is to provide a method and apparatus for drying solid-containing liquids such as milk in a stream of hot drying gas which is first put into a flow of medium velocity, heated and thence brought up to a high velocity, the energy of the flow being then recovered at least partially, the liquid to be dried being introduced at or near the point of highest velocity as a low velocity liquid stream directed concurrently with respect to the flow of drying gas.

Another object of this invention is to provide a drying system and apparatus wherein an amount of drying gas is first put under pressure and moved at medium velocity and a smaller amount of a combustible gas and air are put under pressure in a separate combustion chamber, burned efficiently at high temperatures and the hot combustion gases then introduced into the larger amount of drying gas at the pressure thereof for forming an admixture of heated drying gases.

It is a further object of this invention to provide a method and apparatus for drying heat sensitive solids-containing liquids in which the flavor and body of the solids are retained.

Another further object of this invention is to provide a method and apparatus for drying solids-containing liquids which may more readily than heretofore be reconstituted by addition of liquid to the dried solids.

Still another further object of this invention is to provide a novel and improved dried solid foodstuff (produced according to the method of this invention) capable, upon addition of liquid thereto, of rapid substantially complete reconstitution.

It is a still further object of this invention to provide improved dried milk solids capable of rapid and substantially complete reconstitution upon admixture with water.

A further object of this invention is to provide apparatus for carrying out the improved method of atomizing liquids comprising the combination of a Venturi and an improved apertured means for introducing liquids into the stream of drying gas.

A still further object of this invention is to provide a space saving spray drying apparatus which occupies a minimum area.

Other objects of the invention will become apparent as the description proceeds.

To the accomplishment of the foregoing and related ends, this invention then comprises the features hereinafter fully described and particularly pointed out in the claims, the following description setting forth in detail certain illustrative embodiments of the invention, these being indicative, however, of but a few of the various ways in which the principles of the invention may be employed.

The invention is illustrated with reference to the drawings in which corresponding numerals refer to the same parts and in which:

Figure 7 is a detailed, longitudinal section of the inlet to the drying chamber of the apparatus of Figure 6, shown without insulation;

Figure 8 is a detailed section of the Venturi and the liquid and drying gas inlets of the preferred embodiment of the apparatus;

Figure 9 is an enlarged detail in section of part of the dry gas flow unifying section of the apparatus of Figure 6, also shown without insulation;

Figure 12 is an end view of the liquid delivery means of Figure 11;

Broadly stated, this invention comprises a method of spray drying which includes the steps of introducing a stream of a liquid containing solids to be dried in the form of a relatively low pressure-low velocity stream into a drying area and at the same time introducing a stream of a heated drying gas in a concurrent flow around the liquid stream into the drying area at a relatively high velocity, the provision of means for carrying out this method and the product resulting therefrom.

Figure 1:
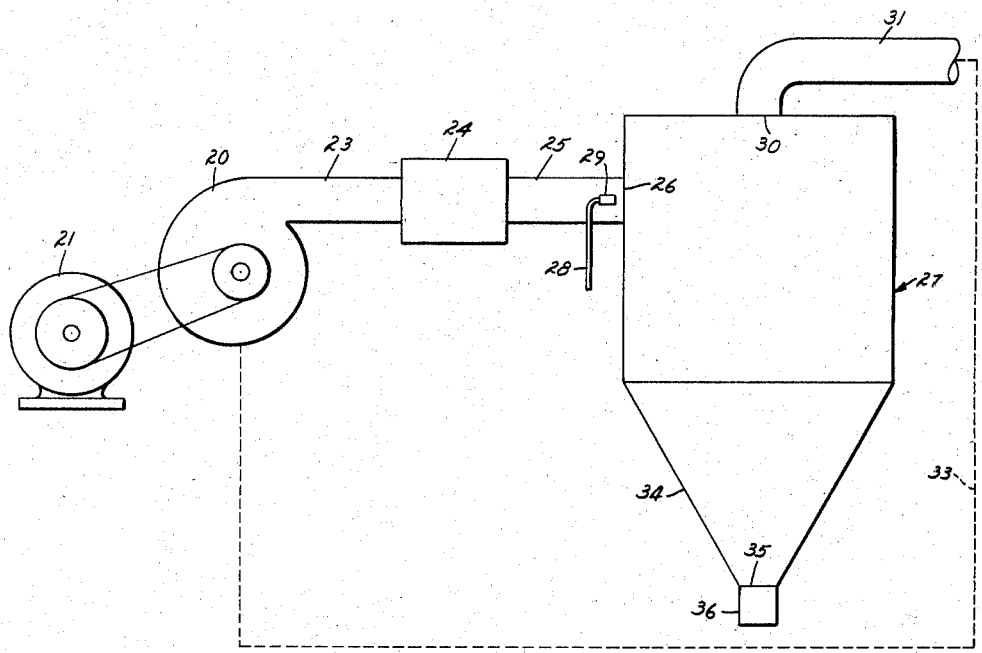
Figure 1 is a diagrammatic and schematic representation of one embodiment of the apparatus by which the method comprising part of this invention may be carried out.

Referring now to the drawings and more particularly to Figure 1, there is here illustrated diagrammatically and schematically one embodiment of this invention in its simplest and broadest form. The apparatus comprises essentially any conventional high velocity blower 20 driven by a suitable electric motor 21 or other power means, capable of delivering air or other drying gas through a conduit 23 to a furnace 24 or other heating means for heating the drying gas; another conduit 25 from the heater to an inlet port 26 in the wall of a drying vessel 27; a liquid supply line 28 and liquid delivery means 29 positioned in conduit 25 adjacent the inlet port 26 to the drying chamber for introducing a low pressure-low velocity stream of liquid containing the solids to be dried into the drying zone. The walls of conduit 25 may be parallel as illustrated or may converge toward port 26. Drying chamber 27 is also provided with an outlet port 30 to conduit 31 to provide for escape of the drying gas which may then, if desired (and after de-humidification) be recirculated to the blower 20, as indicated by dotted line 33, and used again. Drying chamber 27 is also preferably provided with a tapered conical discharge portion 34 terminating in a discharge port 35 and conduit 36 for removal of the dried solids from the drying chamber.

In this form of the invention, a stream of heated drying gas is blown by means of blower 20 through conduit 25 in drying chamber 27 at a high velocity of at least 350 feet per second and up to 1000 feet per second or higher. A stream of the liquid containing the solids to be dried is fed at low pressure through supply line 28 from any suitable tank or other source of liquid supply to liquid delivery means 29 disposed in conduit 25 at approximately the center thereof and adjacent the entry port into the drying chamber. The liquid supply may flow by force of gravity or may be pumped to the liquid delivery means but the pressure applied upon the liquid need only be sufficient to carry the liquid to the delivery outlet where it feeds at low velocity into the drying zone. The rush of the hot drying gases moving at high velocities in a concurrent flow around the delivery opening draws the liquid from the opening and tears and shreds the liquid stream in minuscule droplets which are exposed to the drying effect of the heated gases and quickly dried. The gas and solids are separated in the drying chamber, the gas being vented to the atmosphere or recirculated as desired and the dried particles being collected.

This system of drying by the use of concurrent streams of a hot drying gas at high velocities (viz. 450 to 1500 feet per second or higher) and a liquid containing solid particles to be dried which is introduced via a large liquid delivery opening at low velocity (viz. 2 to 100 feet per second) into the hot drying gas as it moves at a high velocity with respect to the low velocity liquid stream provides a highly efficient method of spray drying. Considerable power is required, however, to drive the blower in order to achieve the required high velocities in the conduit adjacent the inlet port of the drying vessel and where power costs are a determining factor, this system, though providing efficient drying, may be prohibitively expensive. For such areas, a somewhat modified apparatus is provided retaining the high heat efficiency of the system but operating under reduced power requirements.

Figure 2:
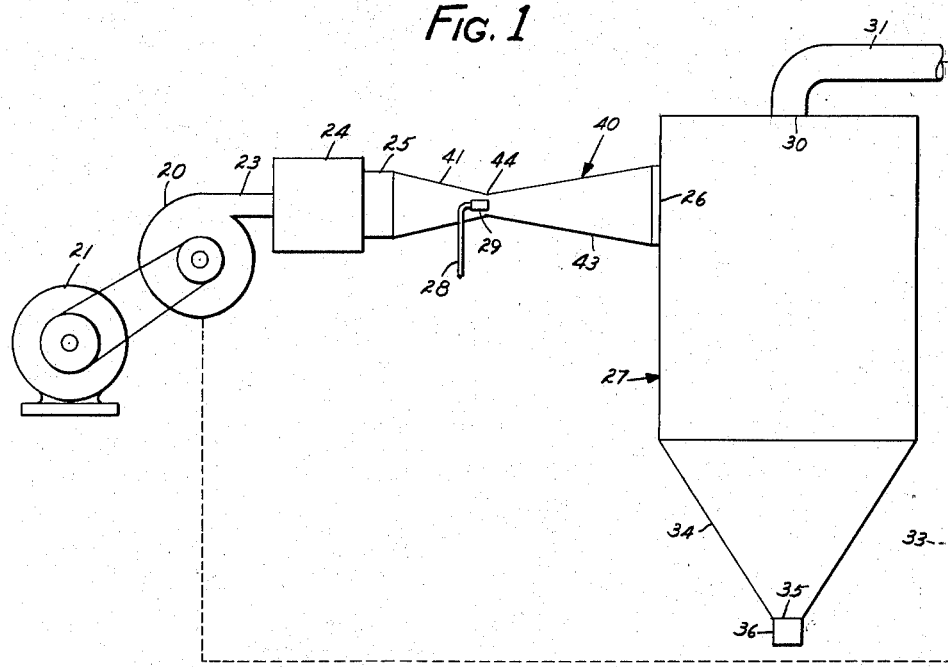
Figure 2 is a diagrammatic and schematic representation of an improved and more efficient form of apparatus by which the method of this invention may be carried out.

The modified form of apparatus is shown diagrammatically and schematically in Figure 2 in its most simplified form. This apparatus comprises the same essential features as the embodiment illustrated in Figure 1 and like numerals are employed to designate like parts. The system thus includes a blower 20 driven by motor 21, conduit 23, heating means 24, drying vessel 27 having entry port 26 and discharge ports 30 and 35, liquid supply line 28 and liquid delivery means 29.

The system is modified in this improved form by inserting what may be termed a Venturi tube, indicated generally at 40 in the stream of conduit 25 between the heating means 24 and entry port 26 into the drying vessel. This "Venturi" tube comprises a converging upstream conical section 41 and a diverging downstream conical section 43 coming together in a narrow throat 44. The downstream end of downstream conical section 43 terminates in port 26 leading directly into the drying chamber 27. Liquid delivery means 29 is positioned so as to be centered in the Venturi tube, preferably upstream from the throat so as to introduce the low velocity coarse liquid stream slightly upstream from the point of greatest constriction (and hence highest velocity) of the drying gas. By means of the system utilizing a Venturi tube, the drying gas may initially be heated and introduced into conduit 25 at relatively low velocities and medium pressure while at the same time the desired high velocities of at least 450 feet per second and up to 1500 or more feet per second may be attained in the throat of the Venturi tube, as hereinafter described in greater detail. The lower initial drying gas velocity requires less power to drive the blower and if constructed for greatest efficiency the downstream section of the Venturi tube further conserves the amount of power necessary to force the drying gas through the apparatus.

We have found that, generally speaking, the included angle of the upstream section of the Venturi tube may be between about 15 and 35 degrees and the length of the tube may be from about 3 to 10 times the diameter of the throat. For maximum efficiency, the included angle of the downstream section of the Venturi tube should be from about 2 to 10 degrees and it may have a length somewhat less than the upper section, that is, from about 2 to 8 times the diameter of the throat.

Figure 3:
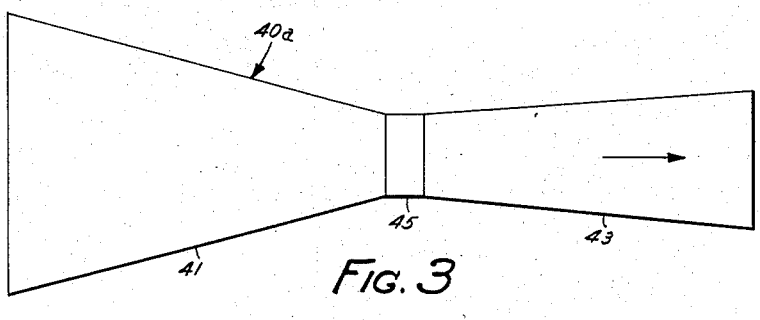
Figures 3, 4 and 5 are illustrations of alternative forms of construction of Venturi tubes which may be employed in the apparatus of this invention.

The efficiency of the Venturi tube may be increased somewhat by modifying the construction of the throat as shown in Figure 3. In this alternative form, the Venturi tube 40a is formed of a converging upstream conical inlet section 41 and a diverging downstream conical discharge section 43 joined at the throat by a short cylindrical throat section 45. The insertion of the cylindrical throat section renders more smooth the path of the stream of hot drying gases through the throat of the Venturi tube by eliminating the relatively sharp edges at the constricted throats and facilitates the movement of the stream of gases. For most practical purposes, the length of the cylindrical segment 45 may range from about one-fourth of its diameter up to equal to or greater than the diameter.

Figure 4:
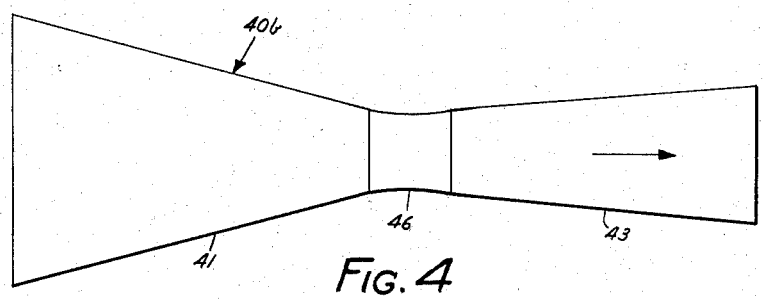

Even greater efficiency may be achieved by adopting the alternative construction of Venturi tube 40b shown in Figure 4. In this form, the inlet conical section 41 and discharge conical section 43 are joined by a generally cylindrical segment 46, the inner walls of which form a parabolic curve, in section, as shown, substantially eliminating any projecting edges in the inner walls of the Venturi tube. This parabolic section may be rolled or spun into the desired shape and may have a length up to twice the diameter of the throat.

Figure 5:
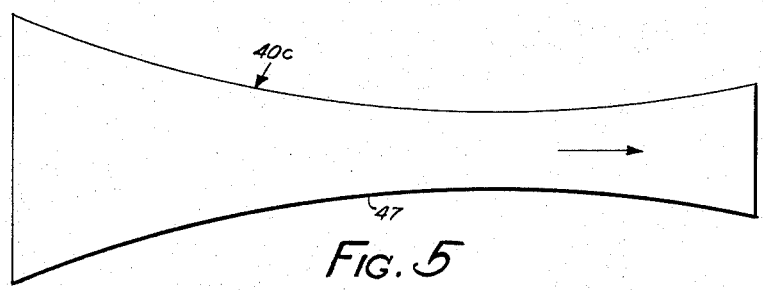

The ultimate in efficiency is achieved by the use of the alternative form of Venturi tube construction shown in Figure 5 in which the entire Venturi tube 40c is spun or rolled so as to form a tube, the walls 47 of which form a parabolic curve in section, as shown, being flared outwardly at the upstream and downstream extremities and forming a gently constricting throat intermediate of the ends. The same limitations as to dimensions and included angles hold generally true for this form of construction as far as the straight walled forms.

We have determined the herein specified shapes of the herein designated "Venturi" throat by experimentation. Strictly speaking, the term "Venturi," as herein used, is not exact, but it is used because (to our knowledge) the English language provides no better term. The true Venturi tube was first used in connection with the flow of non-compressible liquids and the laws governing the flow of such liquids have been well studied and are reasonably well known. In connection with the flow of homogeneous compressible fluids (such as gases, air, steam, etc.) far more complex flow behavior patterns are encountered, particularly when heat effects and flows of transonic and super-sonic rates are involved. The shaping of tubes of general "Venturi" configuration for the best handling of such flows are fraught with many difficulties. Superimposed upon the variables imposed by fluid compressibility there is, in the field of drying of solids-containing fluids of this invention, again added the variable due to thermal effects, such as cooling (and hence contracting) of the drying gas (as it flows) due to evaporation of water in the substance being dried; shock waves (in the near-, trans- and supersonic flow ranges) and variability due to non-homogeneity, due to inclusion of liquids and solids (partially or completely dried) in the stream flow. Indeed, there is no instrument presently available which can be used for the exact measurement of flow rates of a mixture of gas (such as drying air) which carries particles of solid-containing liquids and partially or completely dried solids. Hence, this invention is in an area of empirical investigation wherein the system of trial and error still rules and while terminology must be used to explain as well as possible the effects realized, in some cases at least, as in respect to the term "Venturi," the terminology adopted is not strictly exact. This explanation is interposed so that others who may have occasion to study our disclosure may properly evaluate the results.

A somewhat more complete, detailed and commercial form of spray drying system is shown in the remaining figures of the drawings. Reference is now made to the overall vertical sectional elevational view of the spray drying system shown in Figure 6 in which there is a chamber indicated generally at 50 supported upon stand 51 which in turn rests upon a floor 53. An inlet 54 enters the center of the top of the upper portion of the drying chamber 55. The lower portion of the drying chamber 56 is generally conical and tapers down to a discharge outlet 57. The upper cylindrical portion of the drying chamber is provided with a layer of insulation 58. To minimize adherence of spray dried particles to the inner walls of the drying chamber there are provided chains 59 suspended from bars 60 which rotate slowly with respect to the walls of the drying chamber during the drying operations.

Supported on top of the drying chamber and in direct communication with inlet 54 there is provided a Venturi system indicated generally at 40a. The Venturi system, which is of shape similar to Figure 3, consists of an upper converging inlet portion 41, a throat 45 and lower diverging discharge portion 43. Disposed within the restricted throat 45 is an apertured head or delivery means 61 for the introduction of the fluid to be dried. A stream of the liquid to be dried is conducted to the liquid delivery opening 61 through a low pressure feed tube 63 which passes through a guide tube 64 to a supply line 65 which in turn is encased in a rigid guide tubing 66. Disposed above the inlet to the Venturi system 40a and in direct communication with it is a flow unifying section indicated generally at 67. This section consists of a portion of the drying gas conduit packed full of thin-walled (preferably stainless steel) tubes 68 of relatively smaller diameter than the gas conduit. The thin-walled tubes are disposed longitudinally within the conduit and rest upon screen 69. An elbow 70 containing a plurality of straightening vanes 71 leads from duct means 73 for the drying gas to the flow unifying section. The vanes 71 are sheets of metal curved around the center of curvature of the duct 70.

The duct means for the drying gas consists of a long conduit 74 covered with insulation 75 leading from a source of hot drying gas which may be heated fresh air or dehumidified, reheated inert gas such as nitrogen, argon, helium and the like. Conduit 74 is provided at its lower end with gas inlet 76. The air or other drying gas entering inlet 76 may be preheated by means of steam coils 77 in the duct. Air may be conveniently introduced into the inlet by means of blower 78 through filter 79 and conduit 80 where it is delivered under pressure through heater 77 (where used) and to duct 73. The drying gas may be conveniently heated by means of a furnace 81 having a fire box 83 disposed at the lower end of conduit 74. The fire box 83 is under pressure slightly exceeding the pressure in duct 73. By this means an oil or a gas burner (not shown) placed in fire box 83 will not only further heat the preheated air entering through inlet 76, but the flue gases themselves may be used as part of the drying gas. The fire box 83 operates at very high temperatures for efficient combustion and the very hot combustion gases then enter duct 75 at its lower elbow and dilute the main stream to a final mixture which has a temperature of 250° to 1500° F.

As mentioned, the drying gas may be re-circulated or simply used once. For the once-through type of operation, atmospheric air enters at filter 79 and may be passed through a dehumidifier to reduce its moisture content. The drying air is then heated, here illustrated as a steam-preheat via heat exchanger 77, plus an inflow (under pressure) of hot combustion products of furnace 83. The resultant drying gas in duct 73 is piped in a suitably insulated pipe to the convergent section 41 and to the throat 45 of the Venturi system 40a, where the velocity of the drying gas is in the stated range of 450 to 1500 feet per second or even higher. Thence, the drying gas passes through the throat 45 (where dispersion of the slow-moving fluid takes place) and delivers through Venturi section 43 (where power is recovered) and to chamber 50 in which the solids, now dried to a powder already partly dried in the Venturi 40a, is reduced to a fully dry powder. From outlet 57, the flow continues via dotted line 84 to a gas-solid separator, here illustrated as a cyclone 85, although other separators, such as electrostatic or filter type may be used. From line 86, the air is either discharged through valve 87 to pipe 88, or, if the drying gas is inert, such as nitrogen, argon, helium or the like, the gas is recirculated through three-way valve damper 87 (and line 89) through a dehumidifier 90 (provided with refrigerant inlet and outlet pipes 91, 93) and then returned via a pipe 94 to inlet of filter 79, which is (in such recirculating system) merely placed in the return line 94 and is not open to atmosphere. A gas make-up line 95 may be connected to line 94 to make up losses and maintain such closed system (if used) under slight positive pressure.

Figure 11:
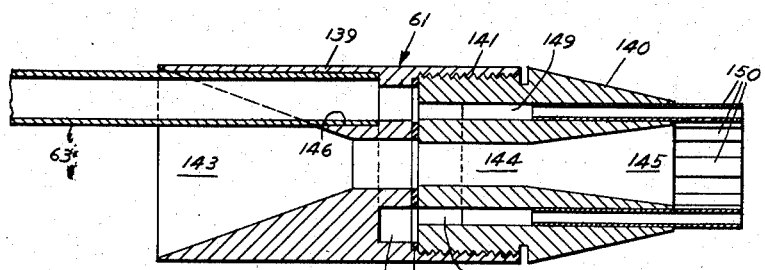
Figure 11 is an enlarged detail, partly in section, of one form of the improved apertured liquid delivery means which forms part of this invention.

There are several distinct differences in the drying system of this invention. It must be emphasized that according to this system, while some drying takes place in chamber 50, most of the drying appears to take place in the downstream section 43 of the Venturi system 40a. This allows great space reduction as compared to conventional driers. Also (unlike prior systems of drying which propel particles of the fluid at extreme atomizing velocities into a relatively slow or non-moving drying air and require exceedingly high pressure, small diameter nozzles) in the system of this invention the low pressure (2 to 50 pounds) liquid lines terminate in large liquid delivery openings (example 0.33 inch) located at the Venturi throat, and in themselves produce no atomizing. This system utilizes a high velocity concurrent flow of drying gas at extreme velocities (i.e. 450 feet per second to 1500 feet per second or higher, hence from the near sonic to super-sonic range, Mach 0.2 to 1.0) to produce atomization. Atomization appears to be due to a "shredding effect." The high speed gas shreds off minute particles from the gross flow of liquid at the low pressure liquid delivery openings. Hence, while in the form of delivery means illustrated in Figure 11 the liquid flow from the individual delivery apertures may be as large as a common match or knitting needle (.005 inch to .050 inch or larger) and is moving out slowly, it is snatched away, being torn into shreds by the high velocity drying gases.

By utilizing near-sonic, sonic or supersonic velocities of drying as in the present drying system, there is believed to be achieved still another effect, namely dispersion of the liquid being dried without the use of high pressures and small orifice nozzles. This effect is believed to be due to establishment of multiple standing shock waves in the drying zone. As the velocities in the stated range are reached, there are set up at each surface of discontinuity (sharp edge or sharp change in configuration), a standing shock wave which forms a zone through which particles of liquid or partially dried liquid pass. Thus, at surfaces 45a, 45b and from the liquid delivery means surfaces there emanate such standing shock waves, which, being reflected back by the wall of sections 45 and 43, form barriers against which the particles impinge. The liquid delivery means (no matter how simple in shape) thus always produces a shock wave in the very region of the drying zone, when the drying gas is in the prescribed velocity range, and where there are multiple liquid delivery openings (as Figure 11) there are multiple intersecting shock waves. This is one phase of operation of our device which is believed at least in part to account for the increased drying efficiency of our device and fine particle size of the powder produced all without the need for high pressure pumps and small orifice pumps heretofore used.

Figure 7 is a fragmentary view showing in section a detail of the inlet to the upper part of the drying chamber and the lower part of the Venturi drying nozzle. There is here shown inlet 54 entering the top portion of the drying chamber 55 from the diverging discharge section 43 of the Venturi. Chains 59 are supported at the outer ends of radial bars 60 which in turn are supported at their inner ends by rim or flange 96 of annular sleeve 97. The chain holding assembly is mounted for rotative movement by means of ball bearings 98 held between races 99 and 100 and bushing 115. Power for this rotative movement is provided by wheel 101 whose hub 103 is keyed to sleeve 97, the wheel being driven by the belt 104 in rim 105 from a source of power not shown. This may conveniently be a small electric geared motor mounted on the top of the drying chamber. Ball bearing race 100 is held within an annular flange 107 bolted to the top 55 of the drier by means of stud bolts and nuts 109. Resting upon and within sleeve 97 is a collar 110 held at its outwardly projecting upper rim by bolts 113. The inwardly projecting lower rim of collar 110 supports the brass packing ring 114 held down by a bushing 115 which is held in place by bolts 116. Bushing 115 rotates upon a steel collar 117 fixed to the lower end of the diverging discharge section 43 of the Venturi.

The construction of the drier Venturi system 40a and the inlets for the liquid and drying gas is shown in more detail in Figure 8. Guide tube 64 for the liquid line intersects elbow 70 and straightening vanes 71 and extends down through flow unifying section 67 to provide a passage for the line carrying the stream of liquid to be dried. Tube 64 insulates the liquid stream somewhat from the hot drying air at this point, which is important in starting up the system. The stream of liquid enters through supply line 65 through a coupling 118 to a section of feed line 119 held in guide tube 64 by bonnet assembly 123. The lower end of feed line 119 is thickened, with its outer edges flattened as shown at 125 in Figures 8 and 9 and especially in Figure 10. The upper end of atomizer feed line 63 is flanged and attached to 125 by means of a union 126. The thickened end 125 of feed line 119 is held within the guide tube 64 within a collar 127 by means of set screws 128. Collar 127 is held spaced concentrically within the conduit by means of braces 129. The positioning of nozzle 61 within the throat 45 of the Venturi may thus be very accurately adjusted and controlled by means of the set screws 128. Access to the interior of the conduit for making these adjustments is provided through port 130 covered by removable plate 131 held in place by bolts 133. A neoprene or similar gasket 134 shown in Figure 10 prevents loss of hot air around the edges of cover 131.

Figure 6:
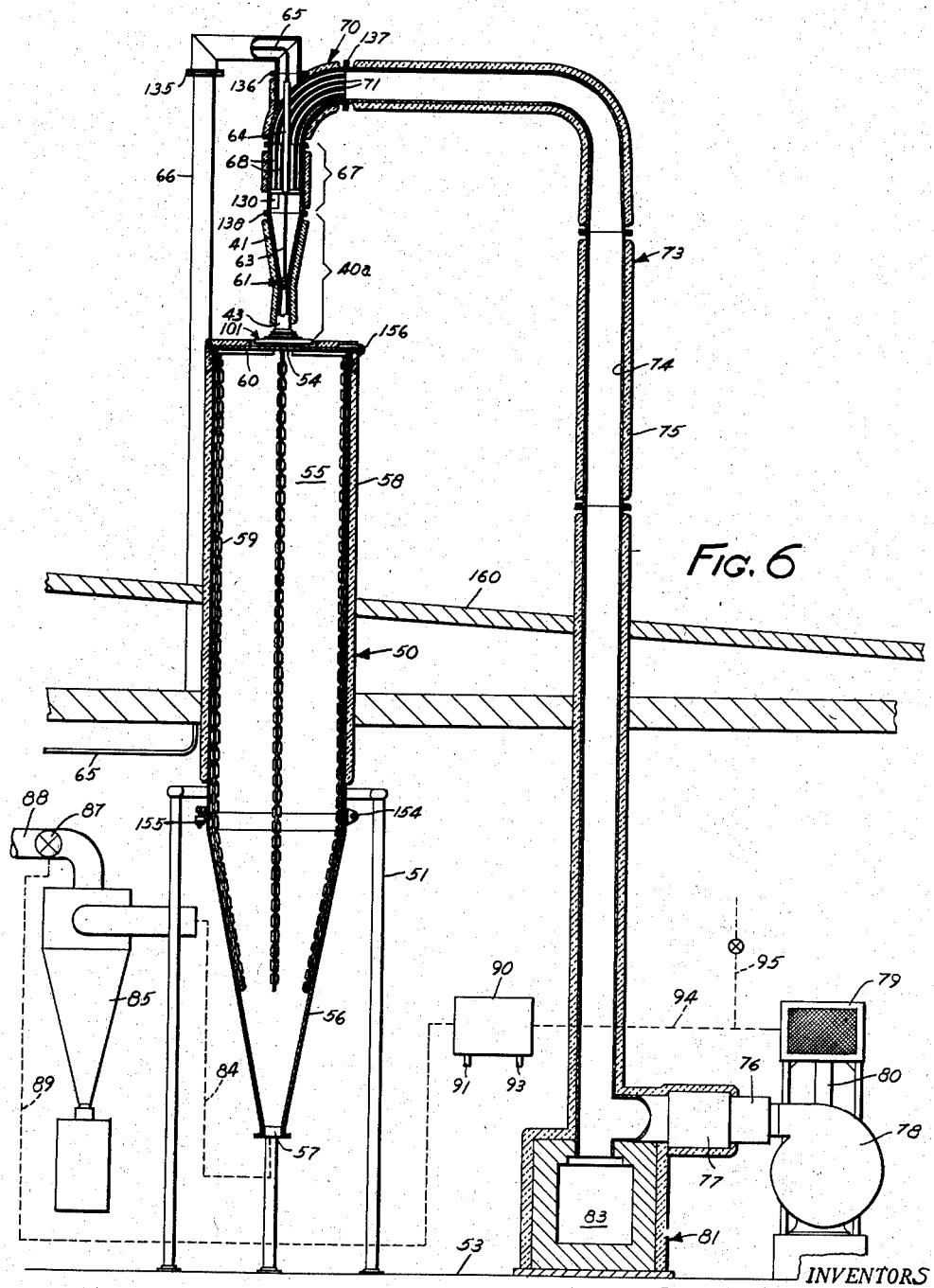
Figure 6 is a side elevation, partly in section, of a preferred embodiment of the improved apparatus of this invention.

The pipes 73, 74, elbow 70, straightening and port section 67 and the Venturi system (down to the middle or the lower part of the downstream section 43) are hot (i.e. 300 to 800° F. or higher, depending on operating conditions). These parts of the drying gas duct of the system, all the way from the heater 77, 83 as well as the heaters, are lagged so as to prevent heat loss but may conveniently be built so as to protrude above the general building level, as shown in Figure 6. This is a feature of the invention which greatly reduces installation costs. Evaporation starts right at nozzle 61 and the drying gas is very rapidly cooled off to lower temperatures, so less insulation is needed around chamber 50 and insulation is omitted from that relatively small area of the hinged cover of chamber 50 at the drive for the cleaner chains. The Venturi system 40a, straightening and access section 67 and elbow section 70 are all flanged. These flanges may be bolted or held in place by clamp rings or nuts and bolts. The liquid line may be uncoupled at union 126 and section 63 and delivery means 61 withdrawn through access door 130. Liquid line housing 66 may be uncoupled at flanges 135 and 136 and lifted to allow access to liquid line coupling 123. Then couplings 137 (between duct 74 and elbow 70) and 138 (between Venturi system 40a and section 67) can be loosened and the unit composed of elbow 70 and 67 can be lifted off. When this is done, the Venturi 40a on lid 55 of drying tank 50 can be swung back on hinges 156 to afford access for cleaning or repairs.

Additional means are provided for access to the interior chamber 50 for cleaning and inspection from the bottom. Line 84 is disjoined from the flanged discharge outlet 57 of the chamber 50. The lower cone-shaped discharge section 56 of the chamber being hinged at 154 and held by swinging eye bolts 155 may be released and swung away to provide access to the interior of the chamber. The chamber may thus be completely opened, top and bottom, for cleaning, inspection and repairs.

Figure 10:
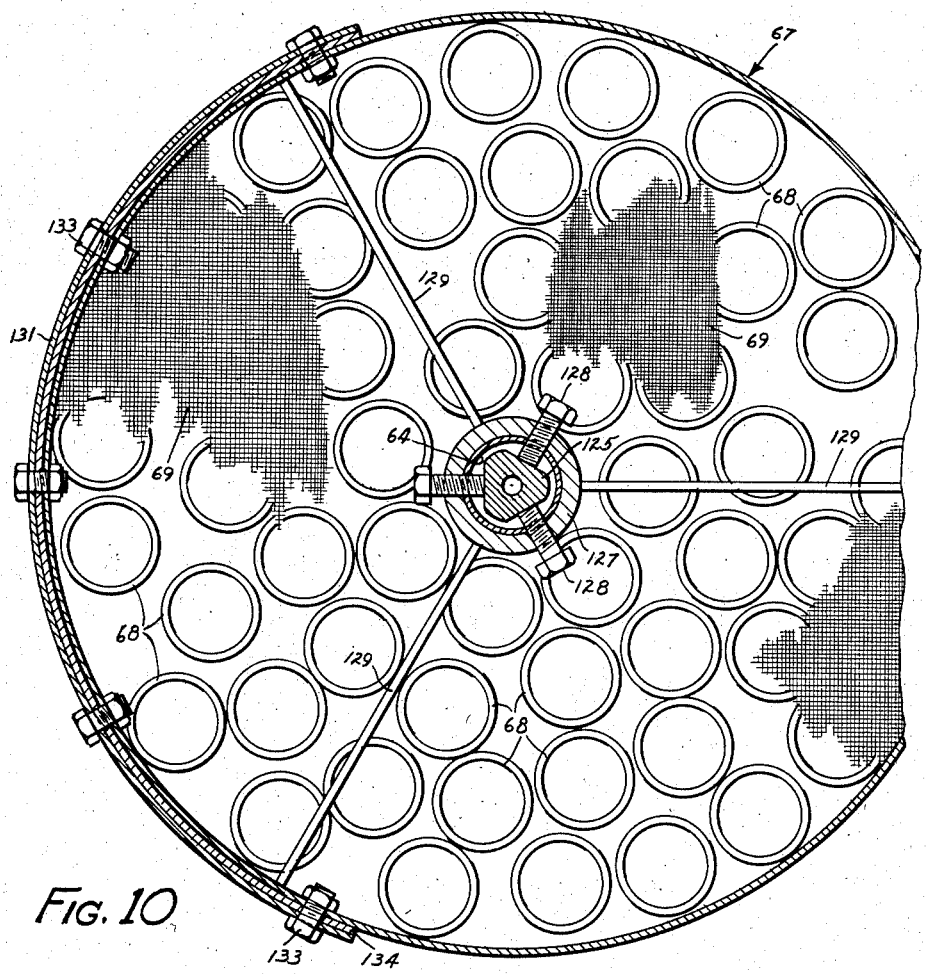
Figure 10 is an enlarged detail, partly in section, taken along line 10—10 of Figures 8 and 9 in the direction of the arrows.

In Figures 8, 9 and 10 there are shown in more detail screen 69 resting upon braces 129 and supporting tubes 68 packed longitudinally within section 67 of the conduit to unify the flow of the drying gas before it enters the Venturi. Tubes 68 serve to distribute the drying gas uniformly over the cross sectional area of the conduit.

The construction of the apertured liquid delivery means 61 is shown in more detail in Figures 11, 12, 13 and 14. In the form illustrated in Figures 11 and 12 the delivery means comprises a generally cylindrical female member 139 into which a male member 140, tapered at its outer extremity, is threaded at 141. A central aperture runs lengthwise through the liquid delivery means converging from the upstream end at 143 to a narrow restricted throat 144 and then diverging again to the tapered downstream end at 145. A channel 146 is provided at one side of the central aperture for the end of feed line 63. Communicating with channel 146 and thus with feed line 63 is an annular channel 147 in member 139 and a corresponding annular channel of somewhat smaller cross section in member 140. Communicating with annular channel 148 are a plurality of ports 149 surrounding central aperture 145. Inserted in each of ports 149 and extending somewhat beyond is a hypodermic needle-like jet. A perforated gasket 151 between members 139 and 140 prevents leakage of liquid within the liquid delivery means.

Figure 13:
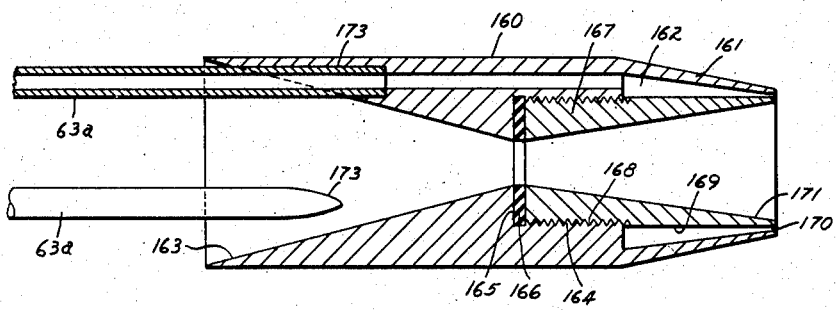
Figure 13 is an enlarged detail sectional view of an alternative form of apertured liquid delivery means.
Figure 14:
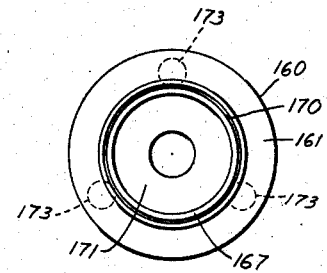
Figure 14 is an end view of the liquid delivery means of Figure 13.

In the alternative form illustrated in Figures 13 and 14 the liquid delivery means comprises a generally cylindrical female member 160 tapered externally at one end 161 and having a central aperture running axially the length of member 160. Adjacent the tapered end, member 160 is provided with an internal annular channel or groove 162. At the opposite end there is provided an inwardly converging tapered conical central aperture 163. Intermediate of channel 162 and converging aperture 163 the member is internally screw threaded as at 164, the threads terminating in a seat 165 for a gasket 166. Seated in threads 164 and upon gasket 166 is a generally cylindrical plug-like male member 167 externally threaded at one end 168 and smooth walled at the other 169, the smooth walls serving when the male member is in place to complete the walls of annular channel 162 and providing a arrow annular liquid discharge opening or outlet 170 from channel 162. Member 167 is likewise provided with an inwardly converging tapered conical central aperture 171 communicating with aperture 163 to form a Venturi-like passage through the liquid delivery means. A plurality of channels 173 (in this case, three) are provided in the edges of the wall of aperture 163 adapted to receive the ends of liquid feed lines 63a and communicating with annular channel 162. The members comprising this form of liquid delivery means have dimensions such that the annular liquid discharge opening is about 0.025 inch wide. It is to be understood, of course, that considerable latitude may be allowed in fixing this dimension ranging, for example, from about 0.005 inch to 0.05 inch or larger.

It will be noted that by employing liquid discharge means of the type illustrated in Figures 11 through 14 embodying an internal air scoop or Venturi-like central aperture, it is possible to obtain approximately equal drying gas velocities on either side of the liquid discharge opening. It has been found that by thus initially contacting the liquid on either side with substantially uniform velocity drying gas as the liquid is delivered for discharge to the openings of the delivery means that encrustation of dried solid particles upon the delivery means is prevented.

Although it is to be understood that the method and apparatus of this invention are applicable to the spray drying of a large variety of liquid materials such as fruit juices, eggs, salt solutions and the like, the mode of operation of the method and apparatus will be described with particular reference to milk. Referring back to Figure 6, initially furnace 81 is fired, preferably with a gas or an oil burner, and steam is introduced into the coils of steam jacket 77 surrounding inlet 76. Blower 78 draws air through a filter inlet 79 through conduit 80 and introduces it through inlet 76 into the duct to be conveyed to the drier chamber. A blower of suitable size for obtaining the stated velocities should be used. At the same time, a stream of liquid is introduced into supply line 65 and pumped to liquid delivery means 61. It is preferred to introduce water into the supply line initially until stable operating conditions have been attained within the drying apparatus. The reason for this is that with the liquid line 63—125 empty, it is quickly heated by the heating gas to a temperature high enough to scorch the initial portion of solids containing organic liquids (such as milk). Hence, water is first pumped through. This cools the liquid line down to a safe operating temperature for the liquid for while there may be some heating of liquids in tubes 63 and 125, due to the heated drying gases, the amount of heating is not excessive after conditions stabilize. Then the pump is connected to a supply of milk or other liquid and the operation continues without scorching.

The liquid in the liquid line 65—126—63 is pumped under low pressure conditions ranging from about 2 to 50 pounds per square inch. The preheated air enters through inlet 76 to conduit 74 where it mixes with and is heated by the flue gases from the furnace. The heated drying gas should have an initial temperature of from about 250° to about 1500° F. and an initial velocity in tubes 74—73 which will depend upon the volume of air and the size of the tube. This velocity may, for example be 150 feet per second. A heated gas is forced upward through conduit 74 through straightening vanes 71 in elbow 70 through the tubes 68 in the unifying section 67 of the conduit just ahead of the inlet of the Venturi. The flow of the heated gas is substantially uniformly distributed across the cross sectional area of the conduit at the point of entrance into the upstream cone 41 of the Venturi. As the gas enters the converging inlet portion 41 of the Venturi, the cross sectional area of the tube decreases and the velocity increases until it reaches a maximum at the throat 45. At the throat 45 the velocity may be in the near-sonic, sonic or supersonic range (i.e. from 450 feet per second to 1500 feet per second or even higher) and its temperature will still be substantially at the temperature of the gas in the tube 74. At this point, the liquid containing the solid particles to be dried is introduced into the hot gas stream. The velocity of the drying gas in the throat of the Venturi should be increased to at least from about 450 feet per second to 1500 feet per second. The stream of milk as it leaves the liquid delivery openings is coarse and thick, say 1/32 inch to 1/16 inch diameter and moves at relatively low velocity, say up to about 25 feet per second. As the stream of milk contacts the stream of hot drying gas moving at high velocity, it is atomized, the stream of milk being drawn from the delivery openings, torn up and shredded into particles. The particles of the milk stream accelerate up to the velocity of the drying gas which is meanwhile being slowed down in the diverging discharge portion of the Venturi. This produces a "scrubbing effect" between particle and drying gas. The contact between the particle of the stream of milk and the hot drying gas dries the particle somewhat, cooling the air and causing it to contract. Moisture going to the vapor phase adds to the weight of the gaseous phase and compensates somewhat for the reduction of volume of the gas due to cooling. As the velocity of the drying gas continues to decrease the velocity of the particle, due to its greater mass, tends to hold relatively more constant, i.e. above the velocity of the slowing down drying gas, thus producing a further scrubbing effect. Turbulence in the downstream part of the Venturi has the added effect of scrubbing the drying gas over the more dense particles of milk which more readily tend to maintain their velocity constant. The intimate mixture of the milk particles and the hot drying gas is carried down into the drying chamber where drying is substantially completed and then discharged through outlet 57 to a conventional cyclone separator where the dried milk particles are separated from the drying gas. During the operation of the drier, chains 59 slowly rotate with respect to the inside walls of the drying chamber to prevent adherence of the spray dried particles to the wall.

If desired, the drying gas from the cyclone separator may be dried and recirculated through the system. This gas may be either air or an inert gas such as nitrogen. In the event that the drying gas is recirculated, it will be necessary to dehumidify it, and air or oxygen from some other source is, of course, introduced into the furnace in order to insure substantially complete combustion of the fuel within the furnace so as to prevent the introduction of products of incomplete combustion into the system where they may impart an off flavor to the dried milk.

In this form of the invention the principal objects are attained through the use of liquid delivery openings located adjacent the throat of a Venturi at the inlet to the drying chamber in combination with appropriate apparatus for heating and driving the drying gas at the stated velocities. The Venturi enables the drying gas to be accelerated at reasonable cost (for power) to high velocities necessary to achieve the maximum tearing and shredding action on the particles of the milk stream as it is fed into the drying gas. The liquid delivery means should be disposed concentrically within the throat of the Venturi and preferably sufficiently upstream so that the delivery openings are slightly upstream from the narrowest portion of the throat. The diameter of the throat of the Venturi should be at least twice the diameter of the liquid delivery means in order that there may be an adequate flow of gas around the delivery openings. The liquid feed line 63 has a slight bend in its upper end and enters the liquid delivery means at one side in order not to interfere with the action of the air scoop aperture through the center of the liquid delivery means. The throat of the Venturi may be formed by the intersection of the upper and lower cones as shown in Figure 2 of the drawings, or a cylindrical throat may be interposed between the upper and lower cones, as in Figure 3, or preferably the wall of the throat is curved slightly in the form of a paraboloid as in Figures 4 and 5. The length of the straight throat should usually not exceed its diameter and is preferably about one-half the diameter. The included angle and the length of the upper inlet section of the Venturi are not critical. However, since the diameter of the inlet to the Venturi should be about the same as the diameter of the conduit for the drying gas, it has been found that for practical purposes the included angle may be from about fifteen to thirty-five degrees and the length of the upper section of the Venturi may be from about three to ten times the diameter of the throat. Preferably an included angle of from twenty to thirty degrees is used. The dimensions of the lower discharge section of the Venturi are of greater importance.

The principal function of the downstream section of the Venturi is to conserve power, thus reducing to reasonable levels the amount of power necessary to force the drying gas through the drying apparatus. It has been found, for example, that only about one-fourth as much power is required when the conical downstream discharge section of the Venturi is used as compared with allowing the gas and the liquid to be ejected directly into the drying chamber from the constricted throat.

The included angle of the discharge portion of the Venturi may be from about two to ten degrees and the length of this portion may range from two to eight times the diameter of the throat. As the length of the downstream portion of the Venturi increases, the danger of impingement of milk particles at the sides of the Venturi also increases. For a maximum conservation of power and minimum likelihood of impingement, it is preferred that the included angle of the downstream portion of the Venturi be about six degrees and that the length of the downstream portion of the Venturi be six times the diameter of the throat. As the angle of the downstream section increases, there is greater likelihood of getting "separation" of the gas stream from the wall with consequent increase in the power loss due to turbulence and reverse flow of the gas.

The velocity of the drying gas as it passes through the Venturi should be increased up to a minimum of at least about 450 feet per second and preferably to a minimum of from 600 to 1000 feet per second. There appears to be no upper limit to the velocity of the drying gas. This may range up into the sonic or supersonic velocities. However, for practical purposes it is believed that an upper limit of from 1500 to 2000 feet per second may be imposed.

The temperature of the drying gas should be at least about 250° F. For milk the theoretical maximum temperature is about 960° F. However, for other materials the temperature may range up to about 1500° F. or in some cases even higher. Hence, when drying milk the temperature is usually maintained between 250 and 900° F. Preferably, this temperature should be from about 300 to 600° F.

Milk is usually first evaporated to increase the solids content and is then preheated to a temperature of about 140 to 160° F. before it is introduced into the drying apparatus. The pressure applied on the milk supply is merely sufficient to force the milk from the supply vat to the relatively coarse delivery openings through which it is discharged. This is usually of the order of from about 2 to 50 pounds per square inch. Since the drying gases are passing the liquid delivery means at extremely high velocities at the point where the tips of liquid discharge openings are located, there is a partial vacuum set up which is sufficient to draw the milk from the openings at a desired rate and tear and shred the particles for drying. This action is achieved both by the flow of the hot drying gases around the periphery of the liquid delivery means and through the air scoop aperture through the center of the delivery means. In the preferred form of the invention the liquid material to be dried is introduced into the drying gas through an annular slit opening or through a plurality of hypodermic needle-like jets annularly arranged around the periphery of the cylindrical liquid delivery means. For milk in which the solid particles are of the order of about 0.05 mm. discharge openings having an inside diameter of 0.033 inch have proven satisfactory.

A notable feature of the apparatus of this invention is that it occupies a minimum amount of floor space area. It will be noted that a substantial portion of the superstructure of the apparatus need not be housed in the normal drying work room, but may extend above and beyond the roof structure 160 of the building, as illustrated in Figure 6. With the exposed superstructure properly insulated, such an installation may be operated successfully even in the most severe Northern climates.

By way of further illustration of the invention, but without any limitation thereon, reference is made to the following examples which are tabulated for comparison:

*Table I*

| Run Number | 1 | 2 | 3 |
|---|---|---|---|
| Material: 26% Condensed Whole Milk—Pounds per hour feed | 120 | 188 | 25.2 |
| Drying Gas: | | | |
| Inlet Temperature, ° F | 443 | 474 | 251 |
| Outlet Temperature, ° F | 200 | 172 | 165 |
| Volume, cubic feet per minute (75° F., 28.5 in. Hg) | 564 | 555 | 627 |
| Velocity at throat, ft./sec | 783 | 797 | 686 |
| Pounds of water evaporated per hour | 89 | 140 | 18.6 |
| Pounds of powder dried per hour | 31 | 48 | 6.5 |
| Moisture content per powder, percent | 3.0 | 4.4 | 3.6 |
| Solubility Index (Standard Dairy Solubility Test) | 1.4 | 0.15 | <0.1 |

*Table II*

| Run Number | 4 | 5 | 6 | 7 | 8 | 9 | 10 | 11 | 12 | 13 |
|---|---|---|---|---|---|---|---|---|---|---|
| Material: Skim milk— | | | | | | | | | | |
| Percent Solids Not Fat | 30 | 30 | 30 | 30 | 30 | 30 | 30 | 28.5 | 40 | 40 |
| Pounds per hour feed | 117 | 131 | 101 | 202 | 25 | 180 | 236 | 107 | 42 | 54 |
| Drying gas: | | | | | | | | | | |
| Inlet temperature, ° F | 390 | 438 | 432 | 473 | 270 | 460 | 500 | 369 | 269 | 254 |
| Outlet temperature, ° F | 192 | 184 | 208 | 180 | 183 | 183 | 187 | 187 | 182 | 178 |
| Volume, cubic feet per minute (75° F., 28.5 in. Hg) | 540 | 565 | 573 | 555 | 622 | 556 | 485 | 536 | 512 | 490 |
| Velocity at throat, ft./sec | 707 | 782 | 788 | 796 | 698 | 702 | 717 | 685 | 575 | 533 |
| Pounds of water evaporated per hour | 82 | 92 | 71 | 141 | 17.5 | 126 | 165 | 78 | 25.2 | 32.4 |
| Pounds of powder dried per hour | 34.1 | 39 | 30 | 60.6 | 7.5 | 54 | 70.8 | 29 | 16.8 | 21.6 |
| Moisture content of powder, percent | 6.2 | 6.1 | 5.1 | 6.0 | 4.6 | 6.2 | 7.0 | 4.4 | 4.2 | 6.0 |
| Solubility Index (Standard Diary Solubility Test) | <0.1 | <0.1 | <0.1 | 0.1 | <0.1 | 0.1 | 0.2 | 0.1 | 0.1 | <0.1 |

In the foregoing runs, the feed rate in pounds per minute was the weight of the liquid delivered through the liquid delivery means 61. The drying gas inlet temperatures were measured in conduit 74 just above inlet 76.

The velocities of the drying gas were measured at duct 88 while pure water was being introduced through the liquid feed line, and the velocity at the throat of the Venturi was computed from these measurements. The outlet temperature of the drying gas was measured at the outlet from the cyclone separator 85. The moisture content of the dried powder was determined by actual test as was also the solubility index which is a standard dairy product solubility test made in accordance with the methods prescribed by the American Dry Milk Institute, "The Grading of Dry Milk Solids."

It has also been found that when liquid solids-containing foodstuffs are concentrated and dried according to the method of this invention, those products are then more easily and completely reconstituted by addition of liquid to the dried solids than has heretofore been possible. This unexpected phenomenon has been thought to be due to more uniform distribution of particle sizes, especially as to larger particles, with a minimum of fines. Thus, while dried milk produced by any of the normally available conventional drying methods (commercial dried milk powder) contains particles ranging in size from about 10 to 120 microns, with a very few particles somewhat larger and somewhat smaller, the bulk of these particles (as high as 75 percent) will be less than 25 microns. On the other hand, it has been observed with samples of milk solids concentrated and dried according to the method of this invention that the particle sizes ranged from about 70 microns to about 300 microns with relatively few smaller particles which could be counted under a microscope. Whether the absence of smaller particles is absolute or whether the smaller particles have merely agglomerated onto the surfaces of the larger particles is not known and applicants do not wish to be bound by any particular theory. Regardless of the cause, however, the improved results flowing therefrom in reconstituting the liquid product are incontrovertible. Powdered milk concentrated and dried according to the method of this invention poured onto the top of a vessel of cold or lukewarm water immediately begins to sink through the surface of the water and to disperse forthwith forming a uniform homogeneous reconstituted milk in a short time with a minimum of stirring or agitation. On the other hand, ordinary powdered milk powder (commercial) floats on the surface of even very warm water, dispersing only very slightly. The powder will "float" indefinitely in this condition. Stirring of such a non-wetted powder on the water merely serves to break up the floating mass of powder into smaller masses, each of which has a gummy exterior such that the masses float on the surface of the water. These powder masses can be brought into uniform dispersion to form a relatively homogeneous reconstituted liquid milk product only by vigorous agitation of the liquid-solid mixture for a considerable period. This behavior of commercial milk powder is one of the recognized disadvantages of such products and is one of the reasons why there has been consumer resistance to the more widespread use of such commercial dried milk powders.

The improved more readily reconstitutable dried solid foodstuffs of this invention are prepared by first concentrating (by evaporation) the solids-containing liquid to be dried to between about 45 to 65 percent by weight and preferably 50 to 65 percent solids content and then drying such higher-solids-content liquids according to the drying method of this invention. This higher concentration of solids in the liquid used according to this invention compares with the usual solids concentration of from about 20 to 40 percent and most generally between about 35 to 40 percent used in present-day commercial processes of making dried milk and the like. Severeal examples of milk concentrated and dried according to the method of this invention, all of which showed from very good to excellent dispersability characteristics are tabulated.

*Table III*

| Run Number | 14 | 15 | 16 | 17 | 18 |
| --- | --- | --- | --- | --- | --- |
| Material: Milk— | | | | | |
| Percent solids not fat | 48.1 | 48.1 | 45.0 | 45.0 | 51.8 |
| Pounds per hour feed | 205 | 205 | 180 | 180 | 151 |
| Drying gas: | | | | | |
| Inlet temperature, °F | 450 | 450 | 450 | 450 | 432 |
| Outlet temperature, °F | 174 | 174 | 175 | 175 | 173 |
| Dispersibility | Excellent | Excellent | Very good | Very good | Excellent |
| Moisture content of powder, percent | 6.0 | 2.0 | 3.8 | 2.2 | 4.08 |
| Solubility Index | 0.15 | 0.15 | <0.1 | <0.1 | 0.40 |

It is apparent that many modifications and variations of the invention as hereinbefore set forth may be made without departing from the spirit and scope thereof. The specific embodiments described are given by way of example only, and the invention is limited only by the terms of the appended claims.

What we claim is:

1. A spray drying apparatus comprising a drying chamber having an inlet and discharge end, duct means adjacent to and communicating with the inlet end of the drying chamber, liquid delivery means positioned axially within the inlet duct adjacent the inlet end of the chamber for introducing a stream of liquid particles into the chamber, means for heating a drying gas and tube means comprised generally of two truncated cones connected at their small end by a short cylinder for conveying the heated drying gas at high velocity around the liquid delivery means concurrent with the flow of liquid from said liquid delivery means.

2. A spray drying apparatus comprising a drying chamber having an inlet and discharge end, a Venturi-like tube comprised generally of two truncated cones connected at their small ends by a short cylinder disposed adjacent to and communicating directly with the inlet end of the drying chamber, liquid delivery means positioned axially within the Venturi-like tube for introducing a stream of liquid particles into the drying chamber, duct means for conveying a gaseous drying medium to the upstream end of the Venturi-like tube and furnace means for heating the gas.

3. A spray drying apparatus according to claim 2 further characterized in that said liquid delivery means is positioned axially within the Venturi-like tube adjacent and slightly upstream from its throat for introducing a stream of liquid particles at high velocity into the drying chamber.

4. A spray drying apparatus according to claim 2 further characterized by the provision of means comprising a plurality of parallel axis longitudinal conduits in the duct adjacent the Venturi-like tube for unifying the flow of the gaseous drying medium.

5. A spray drying apparatus according to claim 2 further characterized in that the length and included angle of the upstream section of the Venturi-like tube are greater than the length and included angle of the downstream section.

6. A spray drying apparatus according to claim 2 further characterized in that said liquid delivery means comprises an annular liquid discharge opening and having a central aperture throughout its length, said aperture having a converging conical inlet portion and a diverging conical outlet portion, the annular liquid discharge opening surrounding the diverging outlet of said aperture.

7. A spray drying apparatus comprising a generally vertical upstanding elongated cylindrical drying chamber having an upper inlet end and a lower converging conical section forming a discharge end, means mounted within the drying chamber adjacent the inner walls thereof for relative rotative movement therewith to prevent accumulation of dried particles on the walls of the drying chamber, a Venturi-like tube comprised generally of two truncated cones connected at their small ends by a short cylinder mounted axially on the drying chamber at the upper end thereof in communication with the inlet, the length of the upper section of the Venturi-like tube being from about three to ten times the diameter of the throat and the included angle being from about 15 to 35 degrees, the length of the lower section of the Venturi-like tube being from about two to eight times the diameter of the throat and the included angle being from about 2 to 10 degrees, liquid delivery means positioned axially within the Venturi-like tube and slightly upstream from the center of the throat for introducing a stream of liquid particles into the drying chamber, said liquid delivery means comprising an annular liquid discharge opening and having a central aperture throughout its length, means for supplying liquid to the annular liquid discharge opening, insulated duct means for conveying a gaseous drying medium downwardly to the upstream end of the Venturi-like tube means comprising a plurality of parallel axis longitudinal conduits in the duct adjacent the Venturi-like tube for unifying the flow of the gaseous drying medium and furnace means for heating the gas.

8. A spray drying apparatus according to claim 7 in which the means for heating the gaseous drying medium comprises a combustion-fired furnace venting into the gas conveying duct whereby the flue gases from the furnace may be utilized as at least part of the drying gas.

9. The process of spray drying which comprises the steps of forcing a stream of a drying gas through a drying apparatus at an initial temperature of from about 250 to 1500° F. and at an initial velocity of at least about 100 feet per second, increasing the velocity of said drying gas to at least about 450 feet per second, introducing a stream of the liquid containing the solids to be dried into the drying gas at a point of increased velocity in the direction of flow of the drying gas, decreasing the velocity of the combined stream of hot drying gas and said liquid whereby the solids are dried and separating the dried solids from the gas.

10. The process of spray drying which comprises the steps of forcing a stream of a drying gas through a drying apparatus at an initial temperature of from about 250 to 900° F. and at an initial velocity of at least about 100 feet per second, increasing the velocity of said drying gas to at least about 450 to 2000 feet per second, introducing a stream of the liquid containing the solids to be dried into the drying gas at a point of increased velocity in the direction of flow of the drying gas by injecting a plurality of fine streams of the liquid into the drying gas at a relatively low pressure of from about two to fifty pounds per square inch, decreasing the velocity of the combined stream of hot drying gas and said liquid whereby the solids are dried and then separating the dried solids from the gas.

11. The process of spray drying which comprises the steps of forcing a stream of a drying gas through a drying apparatus at an initial temperature of from about 300 to 600° F. and at an initial velocity of at least about 100 feet per second, increasing the velocity of said drying gas to at least about 600 to 1500 feet per second, introducing a stream of the liquid containing the solids to be dried into the drying gas at a point of increased velocity in the direction of flow of the drying gas by injecting a plurality of fine streams of the liquid into the drying gas at a relatively low pressure of from about two to fifty pounds per square inch, decreasing the velocity of the combined stream of hot drying gas and said liquid whereby the solids are dried and then separating the dried solids from the gas.

12. A liquid delivery means for use in spray drying apparatus for introducing a stream of liquid into a high velocity stream of drying gas, which delivery means comprises a generally hollow cylindrical body, the inner surface of said body defining a central aperture extending through the length of said body for passage of drying gas through said body, said central aperture being open and having a converging conical inlet portion and a diverging conical outlet portion, an annular liquid discharge opening surrounding the downstream diverging outlet end of said gas aperture and communicating channel means within said body for supplying liquid to said annular liquid discharge opening.

13. The product produced by the process of claim 9.

References Cited in the file of this patent

UNITED STATES PATENTS

| 788,764 | Fitton | May 2, 1905 |
| 1,078,848 | Gray et al. | Nov. 18, 1913 |
| 2,188,506 | Hall | Jan. 30, 1940 |
| 2,384,998 | Haugh | Sept. 18, 1945 |
| 2,561,394 | Marshall | July 24, 1951 |